(12) United States Patent
Domin

(10) Patent No.: US 7,290,778 B2
(45) Date of Patent: Nov. 6, 2007

(54) CRADLE FOR STEERING ASSEMBLY

(75) Inventor: Ronald J. Domin, Huron, OH (US)

(73) Assignee: Flaming River Industries, Inc., Berea, OH (US)

( * ) Notice: Subject to any disclaimer, the term of this patent is extended or adjusted under 35 U.S.C. 154(b) by 371 days.

(21) Appl. No.: 10/978,123

(22) Filed: Oct. 29, 2004

(65) Prior Publication Data
US 2006/0091665 A1 May 4, 2006

(51) Int. Cl.
B62D 3/14 (2006.01)

(52) U.S. Cl. ............................ 280/93.515; 280/93.514; 280/785

(58) Field of Classification Search ................ 280/785, 280/93.514, 93.515; 180/312
See application file for complete search history.

(56) References Cited

U.S. PATENT DOCUMENTS

| | | | | |
|---|---|---|---|---|
| 1,647,084 | A | * | 10/1927 | Curtis .......................... 180/312 |
| 2,254,282 | A | * | 9/1941 | Griswold ..................... 180/312 |
| 3,958,653 | A | * | 5/1976 | Arning et al. .............. 180/435 |
| 4,392,545 | A | * | 7/1983 | Harasaki et al. ............ 180/294 |
| 4,817,973 | A | * | 4/1989 | Takeda ........................ 280/781 |
| 5,062,369 | A | * | 11/1991 | Cobden et al. ............. 105/396 |
| 5,280,957 | A | * | 1/1994 | Hentschel et al. .......... 280/788 |
| 5,879,026 | A | * | 3/1999 | Dostert et al. ............. 280/781 |
| 6,231,061 | B1 | * | 5/2001 | Cope .................... 280/124.111 |
| 6,398,262 | B1 | * | 6/2002 | Ziech et al. ................ 280/785 |
| 6,514,031 | B1 | * | 2/2003 | Cook .......................... 414/685 |
| 6,554,558 | B2 | * | 4/2003 | Knight ........................ 414/685 |
| 6,733,021 | B1 | * | 5/2004 | Ziech et al. .......... 280/124.109 |
| 6,783,157 | B2 | * | 8/2004 | Huang et al. ................ 280/785 |
| 7,163,076 | B2 | * | 1/2007 | Seksaria et al. ............ 180/291 |
| 7,258,354 | B2 | * | 8/2007 | Kim et al. ............. 280/124.109 |
| 2002/0125672 | A1 | * | 9/2002 | Lee ........................ 280/93.515 |
| 2002/0170755 | A1 | * | 11/2002 | Cope ........................... 180/14.4 |
| 2003/0089545 | A1 | * | 5/2003 | Seksaria et al. ............ 180/312 |
| 2003/0107200 | A1 | * | 6/2003 | Huang et al. .......... 280/93.515 |

OTHER PUBLICATIONS

Four page printout downloaded on Oct. 21, 2004 from Randalls Rack and Pinion Ltd. web site having the domain name www.randallsrack.com. The downloaded pages describe Randalls Rack and Pinion Ltd.'s rack and pinion conversion kit. Publication date is at least as early as Oct. 21, 2004.

(Continued)

Primary Examiner—Eric Culbreth
Assistant Examiner—Joseph Rocca
(74) Attorney, Agent, or Firm—Tarolli, Sundheim, Covell & Tummino LLP

(57) ABSTRACT

The present invention is directed to a replacement steering assembly for a rear steer vehicle and requires no cutting/removal of suspension components or drilling holes or welding of vehicle frame rails. The replacement steering assembly includes a cradle for support a replacement steering system. The cradle includes spaced apart first and second side plates and a center support extending therebetween. A mounting portion of the first side plate includes mounting holes to affix the plate to the left side frame rail and a mounting portion of the second side plate includes mounting holes to affix the plate to the right side frame rail. The first and second side plate mounting holes are configured to align with existing mounting holes in the frame rails which were provided to mount original vehicle steering assembly. The center support is offset vertically downwardly and positioned forwardly of the side plate mounting portions.

15 Claims, 5 Drawing Sheets

OTHER PUBLICATIONS

Two page printout downloaded on Oct. 21, 2004 from Randalls Rack and Pinion Ltd. web site having the domain name www.randallsrack.com. The downloaded pages describe and show photographs of installation of Randalls Rack and Pinion Ltd.'s 1967 Mustang rack and pinion conversion kit. Publication date is at least as early as Oct. 21, 2004.

Two page printout downloaded on Oct. 21, 2004 from Total Control Products web site having the domain name www.totalcontorlproducts.com. The downloaded pages describe Total Control Products' rack and pinion conversion kit. Publication date is at least as early as Oct. 21, 2004.

Two page printout downloaded on Oct. 21, 2004 from Class M Corporation web site having the domain name www.classmproductions.com. The downloaded pages describe Class M Corporation's rack and pinion conversion kit sold under the trade name STEEROIDS. Publication date is at least as early as Oct. 21, 2004.

* cited by examiner

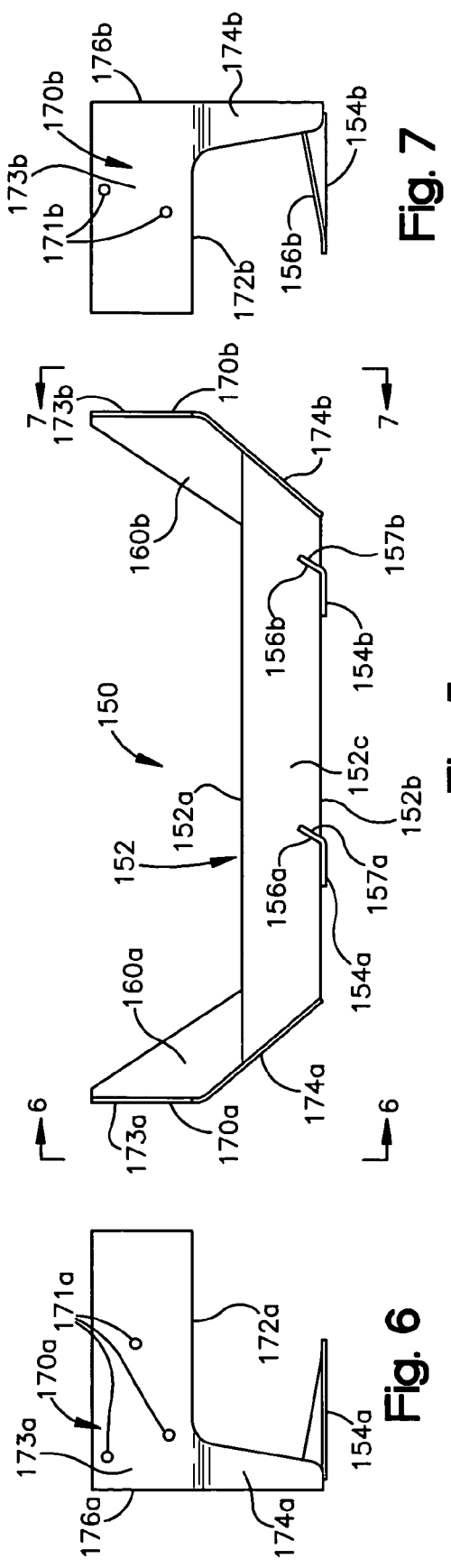

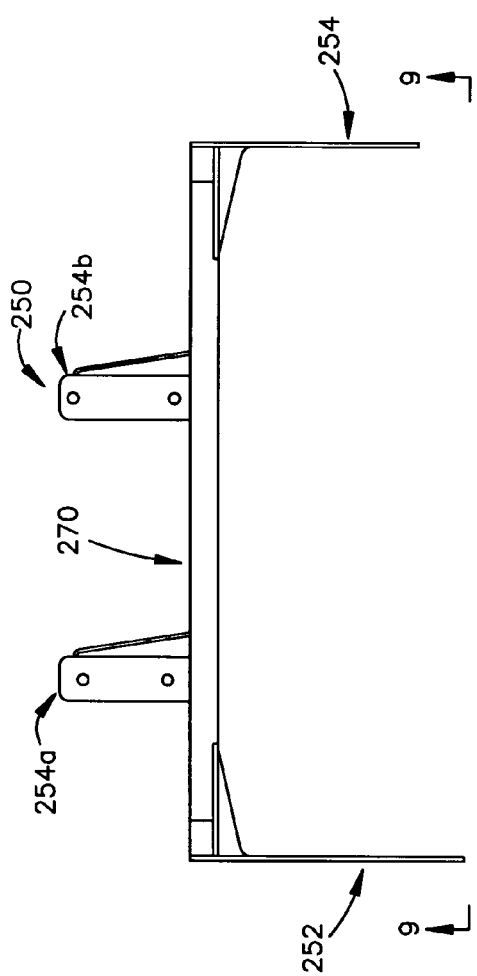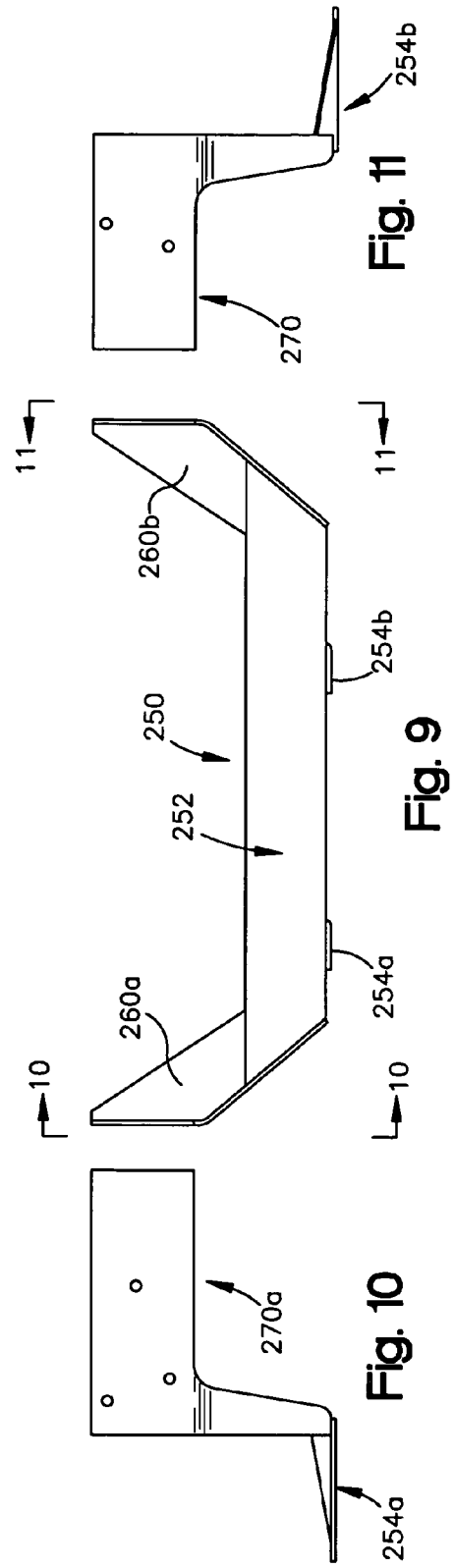

CRADLE FOR STEERING ASSEMBLY

FIELD OF THE INVENTION

The present invention relates to a replacement or aftermarket steering assembly and, more particularly, to a replacement steering assembly including a cradle for supporting the replacement steering system wherein the cradle is adapted to be directly bolted to the vehicle's frame rails without the need for welding or drilling the frame rails or cutting or removal of any vehicle suspension members.

BACKGROUND OF THE INVENTION

The steering systems on many older vehicles are of antiqued design and have poor performance compared with modern steering systems. Owners of such older vehicles, seeking to improve steering performance, may replace original equipment steering systems, such as steering boxes, with better performing, more reliable systems such as rack and pinion steering systems.

When replacing a steering box with a rack and pinion steering system, the vehicle must support the rack and pinion system which typically extends between the vehicle's outer tie rods and is coupled via a linkage to the vehicle's steering wheel. A replacement rack and pinion system typically includes pivoting inner tie rods extending from a center housing that encloses the rack and pinion gearing. The rack is disposed inside the housing and is moved along its longitudinal axis by the pinion gear, which is coupled to the vehicle steering system. The inner tie rods of the replacement rack and pinion system thread into outer tie rods of the vehicle steering system such that as the pinion gear is rotated by the steering wheel, the rack moves longitudinally in one direction thereby moving the inner and outer tie rods and turning the vehicle wheels.

In body-on-frame vehicles, the vehicle body, engine, drive train, braking, steering and suspensions systems are bolted to the frame. The frame includes frame rails and frame cross members which are welded together, much like a ladder. The frame rails are generally parallel steel channels that extend substantially the length of the vehicle along opposite sides of the vehicle and are generally rectangular in cross section.

In unibody vehicles, by contrast, the body and frame are integrated and formed of a single stamping. A unibody vehicle does not have a separate frame, rather the unibody frame includes reinforced support points for mounting the engine, transaxle and other vehicle systems. Specifically, most vehicles with unibody construction include parallel front suspension mounting supports that support the front wheels and the front wheel suspension and steering systems. Some vehicles are a hybrid between unibody construction and body-on-frame construction having a unibody body and a partial or sub-frame that comprises the front suspension mounting supports. As used herein, the term "frame rails" will refer both to the parallel front suspension mounting supports of unibody and hybrid vehicles as well as the forwardly extending frame components that support the front wheels and front suspension systems of body-on-frame vehicles.

Using U-bolts to couple the rack and pinion housing to the frame rails is undesirable because the rack and pinion system becomes part of the vehicle suspension system, essentially becoming a cross member that extends between the frame rails. Flexing of the frame rails as the car is driven subjects the rack and pinion housing to stress, stain and shear forces. Since the rack and pinion system is not engineered to be a suspension member, such use typically leads to poor performance and/or premature failure of the rack and pinion steering system.

A more sophisticated method of supporting a replacement rack and pinion steering system involves mounting the rack and pinion housing to a support cradle and, in turn, mounting the cradle to one or both of the frame rails. Unfortunately, because vehicles designed with a steering box did not envision mounting of a cradle between the front suspension mounting supports, providing clearance for the rack and pinion system and the cradle supporting it is problematic. Because of clearance considerations, prior art cradles typically required cutting/removal of a suspension cross member to make room for the rack and pinion system and the cradle. Obviously, cutting/removal of a suspension member is a major disadvantage both from a performance perspective and from a vehicle resale position. Many potential purchasers of older, vintage vehicles are willing to pay a premium for vehicles that have not been modified, that is, that are in original condition. Thus, vehicle owners who install a replacement steering system for improved performance often want the option of being able to reinstall the original steering system and return the vehicle to its original condition for resale purposes.

Other prior art cradles required either drilling cradle mounting holes into the front suspension mounting supports or welding the cradle to the front suspension mounting supports or a hanger from the mounting supports. Again, this approach has major disadvantages in requiring permanent alteration of the vehicle suspension along with the difficulty and cost attendant with drilling holes in or welding the suspension mounting supports.

What is needed is a replacement steering assembly including a support cradle for properly supporting the replacement steering system and isolating it from the forces transmitted through the vehicle suspension system. What is also needed is a replacement steering assembly including a support cradle that does not require any welding, drilling or other permanent alteration of the vehicle upon installation of the cradle. What is also needed is a replacement steering assembly including a support cradle that does not require any cutting/removal of vehicle suspension members. What is also needed is a replacement steering assembly that is easy to install.

SUMMARY OF THE INVENTION

The present invention is directed to a replacement steering assembly for a rear steer vehicle. A rear steer vehicle in one having the steering system mounted rearwardly with respect to a center line through the front wheels.

The replacement steering assembly includes a cradle for supporting a replacement steering system. The cradle includes spaced apart first and second side plates and a center support extending therebetween. A mounting portion of the first side plate includes mounting holes to affix the first side plate to the left side (driver's side) frame rail and a mounting portion of the second side plate includes mounting holes to affix the second side plate to the right side (passenger's side) frame rail. The first and second side plate mounting holes are configured to align with existing mounting holes in the frame rails which were provided to mount the original steering assembly.

The cradle center support is offset vertically below the side plate mounting portions to provide clearance for the aftermarket steering system from vehicle underbody components including the oil pan, exhaust system and clutch. Extending from the cradle center support are two mounting feet to which the rack and pinion steering system is mounted.

In one preferred embodiment of the present invention, the cradle is a rear-loaded cradle. In this embodiment, the mounting feet extend rearwardly (that is, toward the rear of the car) from the cradle center support. Accordingly, the steering system is mounted on the cradle rearwardly of cradle center support. In a second preferred embodiment, the cradle is a front-loaded cradle meaning the mounting feet extend forward of the cradle center support. Accordingly, the steering system, while still being disposed rearwardly of the center line between the tires, is mounted on the cradle forward of the cradle center support.

Advantageously, the replacement steering system of the present invention includes a support cradle that properly supports the replacement steering system and isolates it from the forces transmitted through the vehicle suspension system including the vehicle frame rails. The cradle of the present invention does not require any welding, drilling or other permanent alteration of the vehicle. Nor does the cradle require any cutting/removal of vehicle suspension members. Finally, the replacement steering system is easy to install.

These and other objects, advantages, and features of the exemplary embodiment of the invention are described in detail in conjunction with the accompanying drawings.

BRIEF DESCRIPTION OF THE DRAWINGS

FIG. 4 is a top plan view of the rear-loaded cradle of FIG. 1;

FIG. 5 is a front elevation view of the rear-loaded cradle of FIG. 1 as seen from a plane indicated by the line 5-5 in FIG. 4;

FIG. 6 is a left side elevation view of the rear-loaded cradle of FIG. 1 as seen from a plane indicated by the line 6-6 in FIG. 4;

FIG. 7 is a right side elevation view of the rear-loaded cradle of FIG. 1 as seen from a plane indicated by the line 7-7 in FIG. 4;

FIG. 8 is a top plan view of a front-loaded cradle;

FIG. 9 is a front elevation view of the front-loaded cradle of FIG. 8 as seen from a plane indicated by the line 9-9 in FIG. 8;

FIG. 10 is a left side elevation view of the front-loaded cradle of FIG. 8 as seen from a plane indicated by the line 10-10 in FIG. 8; and FIG. 11 is a right side elevation view of the front-loaded cradle of FIG. 8 as seen from a plane indicated by the line 11-11 in FIG. 8.

DETAILED DESCRIPTION

First Preferred Embodiment—Rear-Loaded Cradle

Figure 1:
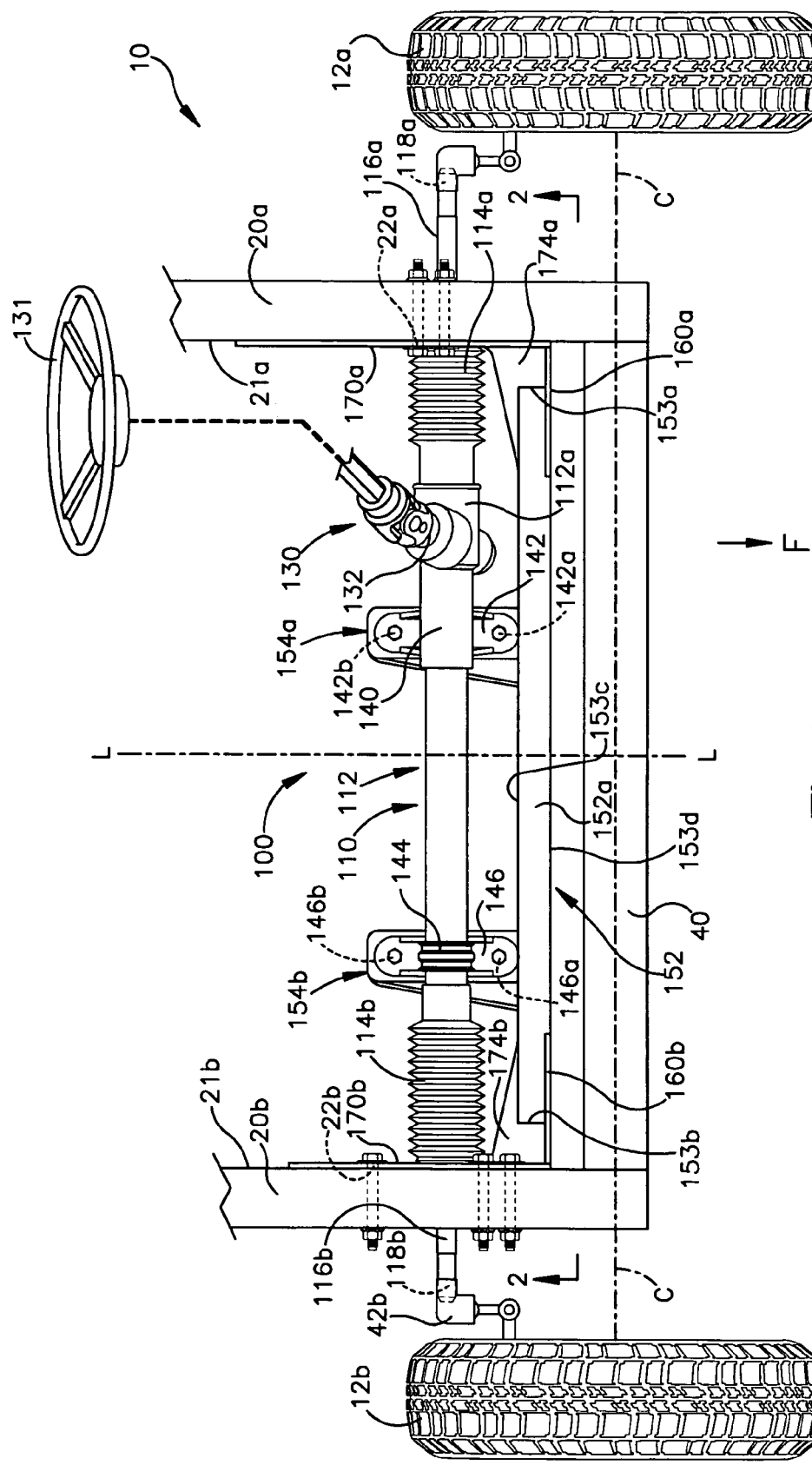
FIG. 1 is a schematic top plan view of a front portion of a rear steer vehicle having a replacement steering assembly including a rear-loaded support cradle.
Figure 2:
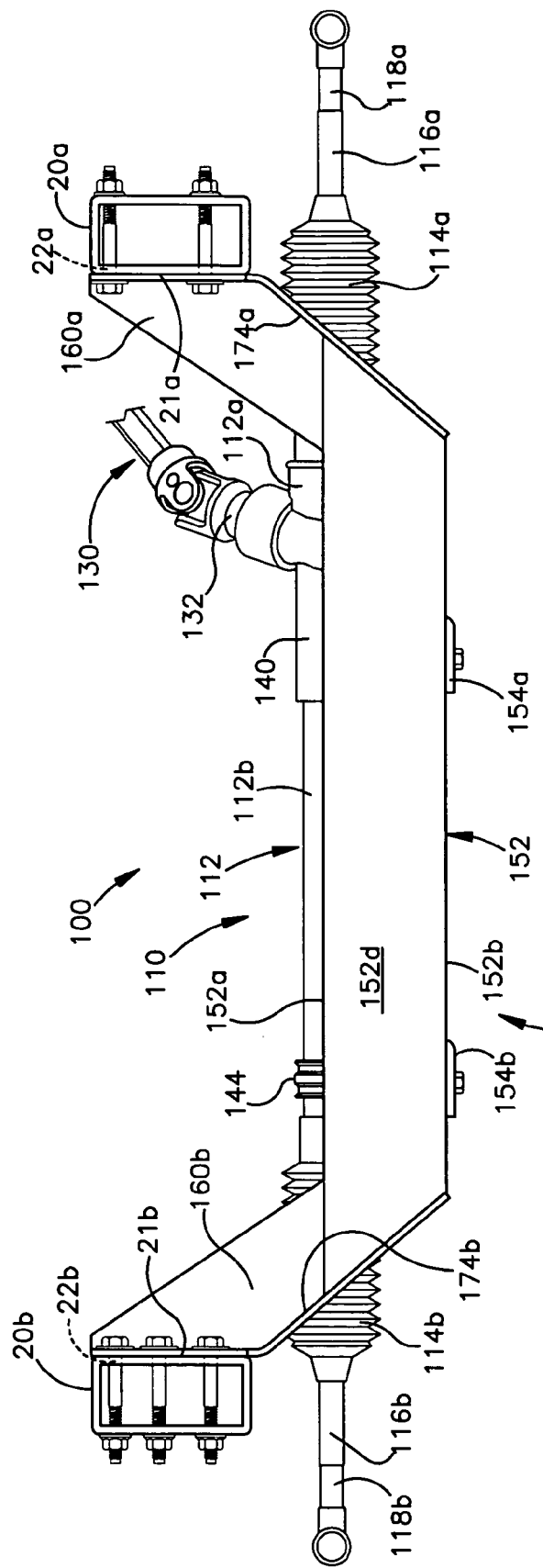
FIG. 2 is a front elevation view of the replacement steering assembly of FIG. 1 as seen from a plane indicated by the line 2-2 in FIG. 1.
Figure 3:
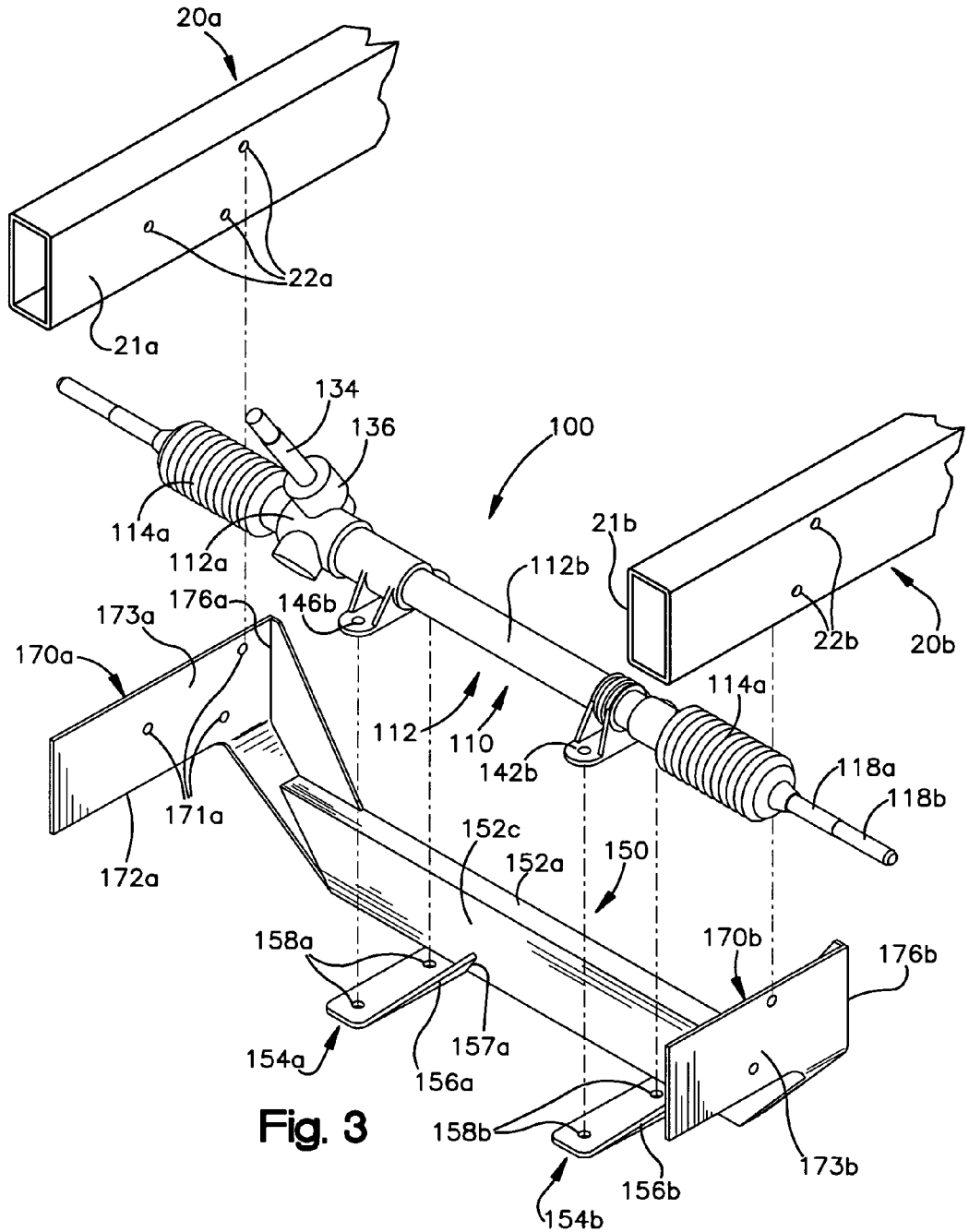
FIG. 3 is an exploded perspective view of the replacement steering assembly of FIG. 1.

One preferred embodiment of a replacement steering assembly is shown at 100 in FIGS. 1-3. The replacement steering assembly 100 includes a manual rack and pinion steering system 110 supported by a cradle or support 150. Advantageously, the replacement steering assembly 100 may be used to replace the original OEM (original equipment manufacture) steering assembly of a vehicle 10 having a rear steer steering system (often referred as an Omni-type steering system) without the necessity of removing or cutting any vehicle suspension members or otherwise changing the chassis configuration.

The replacement steering assembly 100 of the present invention advantageously is a bolt-on system which extends between and bolts directly to the vehicle frame rails 20a, 20b. Moreover, since no cutting of suspension members is necessary and no welding of the cradle 150 to the frame rails 20a, 20b occurs, the replacement steering assembly 100 may be easily and completely removed if it is desired at any point to reinstall the vehicle OEM steering system.

As can best be seen in FIG. 1, which shows a front portion the rear steer vehicle 10, in a rear steer vehicle, the steering assembly 100 is positioned rearwardly (that is, toward the rear of the vehicle) of a center line C-C through the front wheels 12a, 12b. The direction of the front of the vehicle is shown by the arrow F in FIG. 1. It should be recognized that rear steer vehicles include body-on-frame vehicles, unibody vehicles and hybrid vehicles having unibody construction coupled to a partial frame. The replacement steering assembly 100 of the present invention will function in any rear steer vehicle provided that cradle is fabricated with proper dimensions to clear the vehicle oil pan, exhaust system and clutch. In a forward portion of the vehicle 10, the vehicle 10 includes the pair of frame rails 20a, 20b extending parallel to a longitudinal center line L-L of the vehicle 10. The frame rails 20a, 20b support the front wheels 12 and the front wheel suspension system (not shown), as well as the steering assembly 100. A suspension cross member 40 extends between the frame rails 20a, 20b. The suspension cross member 40 is forward of and parallel to the cradle 150.

The manual rack and pinion steering system 110 includes a generally cylindrical rack and pinion gear housing 112. The housing 112 includes an aluminum support housing 112a and a chrome tube 112b extending from the aluminum housing 112a. The housing 112 encloses and supports the rack and pinion gearing (not shown). The affixed to opposite ends of the housing 112 and extending outwardly therefrom are flexible boots 114a, 114b. Extending outwardly from distal openings in the boots 114a, 114b are respective threaded inner tie rods 116a, 116b. End portions of the rack and interior end portions of the inner tie rods 116a, 116b are coupled through respective socket assemblies (which are overlaid and protected from the environment by the flexible boots 114a, 114b) such that the inner tie rods 116a, 116b move with the rack but may also pivot 360° with respect to the rack. This pivoting action of the inner tie rods 116a, 116b with respect to the rack provides necessary movement of the inner tie rods (which must move vertically as the wheels move vertically to negotiate bumps and holes in the road) while protecting the relatively brittle rack and pinion gearing.

Exterior threaded end portions 118a, 118b of the inner tie rods 116a, 116b thread into threaded openings in vehicle original outer tie rod ends 42a, 42b. The remainder of the steering system 100 from the outer tie rods 42a, 42b to the vehicle front wheels 12a, 12b is OEM (original equipment manufacture). While a manual rack and pinion system with a pinion gear offset from the middle of the housing is disclosed, one of skill in the art will recognize that the cradle 150 of the present invention may be used to support various other steering system configurations including center steer rack and pinion systems (wherein the pinion gear centered with respect to the housing) and power assisted rack and pinion systems, among others. The present invention is not limited to a manual rack and pinion steering system with an offset pinion gear.

Extending between a steering linkage 130 extends between the vehicle steering wheel 131 and the rack and pinion system 110. A distal end of the linkage 130 includes a coupling 132 which fits onto a splined shaft 134 (FIG. 3) of the rack and pinion system 110. The splined shaft 134 is mounted for rotation in bearing (not shown) supported by an angled projection 136 of the aluminum housing 112*a*. The splined shaft 134 extends through the housing angled projection 136 is coupled to the pinion gear. As the vehicle steering wheel is turned in one direction, for example, to the left to make a left turn, the pinion gear rotates counterclockwise causing the rack to move axially to the right within the housing 112 and thereby moving the inner tie rods 116*a*, 116*b* to the right. As the inner tie rods 116*a*, 116*b* move to the right, the wheels 12*a*, 12*b* pivot or turn left in a conventional manner.

The aluminum support housing 112*a* of the rack and pinion gear housing 112 includes an integral boss 140. The boss 140 includes a laterally extending mounting projection 142 that defines two mounting openings 142*a*, 142*b* on opposite sides of the housing 112. A collar 144 is affixed to the housing tube 112*b*. The collar 144 also includes a laterally extending mounting projection 146 that defines two mounting openings 146*a*, 146*b*, on opposite sides of the housing.

The cradle 150, in addition to supporting the rack and pinion system 110, effectively isolates the rack and pinion system 110 from many of the forces transmitted through the vehicle suspension system, including the frame rails 20*a*, 20*b* as they flex and twist during normal driving. The cradle 150 includes a center support 152 that extends between a pair of upwardly angled gussets 160*a*, 160*b*. The gussets 160*a*, 160*b* extend between the center support 152 and side plates 170*a*, 170*b*. Preferably, the cradle 150 is fixture-welded to achieve accurate and uniform tolerances in dimensions and angular relationships between the welded steel components of the cradle components. After fabrication, the cradle 150 is painted preferably using a powder coating painting process.

The center support 152 is channel-shaped for added strength and rigidity. The center support preferably is fabricated from 0.1875"-0.25" thick steel and is 1"×3" (1" inch across and 3" vertical). To provide clearance for the vehicle undercarriage components including the oil pan, the center support 152 is offset vertically below the side plates. Typically, the upper surface 152*a* of the center support 152 is offset 3 inches below a lower edge 172*a*, 172*b* of the side plates 170*a*, 170*b*.

Affixed by welding to the center support 152 are two mounting feet 154*a*, 154*b* to which the rack and pinion system 110 is affixed to. The mounting feet 154*a*, 154*b* extend under and are welded to a lower surface 152*b* of the center support 152. For additional strength, the respective mounting feet 154*a*, 154*b* include fluted portions 156*a*, 156*b* that are bent or curved upwardly. An edge 157*a*, 157*b* of each fluted portion extends upwardly along and is welded to a rearward facing surface 154*c* of the center support 152 for improved strength. The mounting feet 154*a*, 154*b* each include a pair of mounting openings or holes 158*a*, 158*b* (preferably ⁷⁄₁₆" diameter). The mounting feet 154*a*, 154*b* support the mounting projections 142, 146 of the rack and pinion housing 112. Steel bolts and lock nuts extends thought the aligned mounting holes of the mounting feet 154*a*, 154*b* and the housing projections 142, 145 to secure the rack and pinion system 110 to the cradle 150.

As can be seen in FIGS. 1-6, the mounting feet 154*a*, 154*b* extend from the center support 152 toward the rear of the vehicle 10. Accordingly, the rack and pinion system 110 is loaded or mounted rearwardly of the center support 152. Hence, the cradle 150 of the first embodiment is referred to as a rear-loaded cradle meaning the rack and pinion system is to the rear of the center support 152. Also recall that since the vehicle 10 is a rear steer vehicle, the cradle 150 and the rack and pinion system 110 are to the rear of the centerline C-C through the front wheels 12*a*-12*b*.

The side plates 170*a*, 170*b* include generally planar mounting portions 173*a*, 173*b* that extend in a direction perpendicular to a longitudinal extent the center support 152, that is, the side plates mounting portions 173*a*, 173*b* are parallel to the longitudinal center line L-L of the vehicle 10 and perpendicular to the cradle center support 152 and the rack and pinion system 110. Because the side plates mounting portions 173*a*, 173*b* utilize the mounting holes in the frame rails 20*a*, 20*b* formerly used by the steering box and the idler arm, the side plate mounting portions 173*a*, 173*b* must extend rearwardly with respect to the center support 152. As can best be seen in FIG. 4, the center support 152 is offset both vertically below and forward of a general extent to the mounting portions 173*a*, 173*b*, that is, forward facing vertical edges 176*a*, 176*b* of the side plates are aligned with a forward facing surface 152*d* of the center support 152.

The cradle 150 extends between and is bolted to respective vertical inward facing surfaces 21*a*, 21*b* of the frame rails 20*a*, 20*b*. Specifically, the side plate 170*a* includes apertures or mounting holes 171*a* that match the number and location of the steering box mounting holes 22*a* in the left side frame rail 20*a*. For example, in a 1965 Mustang, there were three steering box mounting holes in the left side frame rail. The side plate 170*b* includes apertures or mounting holes 171*b* that match the number and location of the idler arm mounting holes 22*b* in the right side frame rail 20*b*. For example, in a 1965 Mustang, there were two idler arm mounting holes in the right side frame rail.

Opposite ends 153*a*, 153*b* of the center support 152 are cut at 45° angles. Projections or wings 174*a*, 174*b* extending from the mounting portions 173*a*, 173*b* of the side plates 170*a*, 170*b* are bent to the same angle as the center support ends 153*a*, 153*b* and are welded along the entire perimeter of the ends 153*a*, 153*b* so as to completely cover the ends. To provide extra strength and rigidity to the cradle 150, the gussets 160*a*, 160*b* extend between the center support 152 and the respective mounting portions 173*a*, 173*b* of the side plates 170*a*, 170*b*. The gussets 160*a*, 160*b* are perpendicular to the wings 174*a*, 174*b* resulting in a right-angle bracket connection between the center support 152 and the side plates 170*a*, 170*b*. One end of the respective gussets 160*a*, 160*b* is welded to the upper surface 152*a* of the center support 152. The opposite end of the gussets 160*a*, 160*b* are welded to the respective vertical forward facing edges 176*a*, 176*b* of the side plates 170*a*, 170*b*. Preferably, the side plates 170*a*, 170*b* and the gussets 160*a*, 160*b* are fabricated of 0.1875" steel plate.

Installation of Replacement Steering System 100

Prior to installing the replacement steering system 100, the rack and pinion system 110 must be bolted to the cradle 150 to form an integral unit. This is accomplished by positioning the mounting projections 142, 146 of the housing 112 on the mounting feet 154a, 154b such that the openings of the projections are aligned with the openings of the mounting feet. Steel bolts are then inserted through the aligned openings and secured with lock nuts.

Additionally, prior to installing the assembled cradle 150 and rack and pinion system 110, the OEM steering system components (steering box, steering idler arm and inner tie rods) must be removed from the vehicle 10.

The cradle 150 is then affixed to the frame rails 20a, 20b. The cradle 110 is positioned between the frame rails 20a, 20b such that the apertures 171a, 171b of the side plates 170a, 170b are aligned with the corresponding openings in the frame rails 20a, 20b. Suitable steel bolts and lock nuts are used to affix the endplates 170a, 170b to the frame rails 20a, 20b.

Next, the threaded inner tie rods ends 118a, 118b of the rack and pinion system 110 are threaded into threaded openings formed in the outer tie rod ends 42a, 42b (which were not removed when the OEM steering system was removed). Finally, the coupling 132 of the steering linkage 130 is affixed to the splined shaft 134 of the rack and pinion system 110 to complete the installation.

Second Preferred Embodiment—Front-Loaded Cradle

A second preferred embodiment of the cradle of the present invention is shown generally at 250 in FIGS. 7-11. In this configuration, instead of the mounting feet extending rearwardly from the center support as was the case in the first embodiment, the mounting feet 254a, 254b extend forwardly from the center support 252 toward the front of the vehicle 10. Therefore, the rack and pinion system 110 is loaded or mounted forwardly of the center support 252. Hence, the cradle 250 of the second embodiment is referred to as a front-loaded cradle meaning the rack and pinion system 150 is to the front of the cradle center support 252. However, bear in mind that since the vehicle 10 is still a rear steer vehicle, the cradle 250 and the rack and pinion system 110 are both still to the rear of the centerline C-C between the front wheels 12a, 12b. Except for the orientation of the mounting feet 254a, 254b, in all other respects, including the center support 252, side plates 270a, 270b and gussets 260a, 260b are the same as disclosed in the first embodiment and will not be repeated here.

Front mounting of the rack and pinion system is advantageous because it provides increased clearance for the vehicle exhaust system located rearward of the cradle center support 252. Many vehicles with aftermarket header or exhaust systems do not provide sufficient clearance for the rack and pinion system 110 when the rack and pinion system is rear-loaded on the cradle (as shown in the first embodiment). The ability to mount the rack and pinion system 110 on the cradle 250 frontward of the cradle center support 252 increases the number vehicles that may advantageously use the present invention.

It is important to note that with respect to both embodiments, specific dimensions of the cradle components and position of mounting holes will be determined by clearance requirements with respect to the vehicle undercarriage including the oil pan, exhaust system and clutch, the location of the mounting holes of the OEM steering system, and the configuration of the replacement/aftermarket steering system 110, steering linkage requirements, etc., as would be recognized by one of skill in the art. Thus, the cradle configuration will necessarily be modified from what is shown in the drawings for different vehicles models.

While the present invention has been described with a degree of particularity, it is the intent that the invention includes all modifications and alterations from the disclosed design falling with the spirit or scope of the appended claims.

I claim:

1. A replacement steering assembly for a rear steer vehicle wherein the rear steer vehicle includes frame rails and preexisting mounting holes in the frame rails for supporting an original steering system of the vehicle, the replacement steering assembly comprising:
   a) a replacement steering system; and
   b) a cradle for supporting the replacement steering system, the cradle including:
      1) spaced apart first and second side plates and a center support extending between the first and second side plates;
      2) the first side plate including a mounting portion having mounting holes to affix the first side plate to a left side vehicle frame rail;
      3) the second side plate including a mounting portion having mounting holes to affix the second side plate to a right side vehicle frame rail;
      4) the mounting holes of the first side plate being aligned with preexisting mounting holes in the left side vehicle frame rail and the mounting holes of the second side plate being aligned with preexisting mounting holes in the right side vehicle frame rail;
      5) a pair of mounting feet extending from the center support toward a rear of the vehicle, the pair of mounting feet supporting the steering system such that the steering system is offset rearwardly of the center support; and
      6) the cradle center support being offset vertically below the mounting portions of the side plates to provide for clearance of the replacement steering system with respect to an undercarriage of the vehicle and the cradle center support being offset vertically below all of the mounting holes of the mounting portions of the side plates.

2. The replacement steering assembly of claim 1 wherein each of the cradle side plates further include a downwardly extending wing affixed to respective ends of the center support.

3. The replacement steering assembly of claim 2 wherein the cradle additionally includes a pair of gussets extending between respective mounting portions of the side plates and the center support.

4. The replacement steering assembly of claim 3 wherein the downwardly extend wings and the pair of gussets form a right-angle bracket extending between the mounting portions of the side plates and the center support.

5. The replacement steering assembly of claim 1 wherein the center support is a channel that is rectangular-shaped when viewed in cross section.

6. The replacement steering assembly of claim 1 wherein the steering system is a manual rack and pinion steering system.

7. A cradle for supporting a replacement steering system in a rear steer vehicle wherein the rear steer vehicle includes frame rails and preexisting mounting holes in the frame rails to support an original steering system of the vehicle, the cradle comprising:
   a) spaced apart first and second side plates;
   b) a center support extending between the first and second side plates to which the replacement steering assembly is coupled;

c) the first side plate including a mounting portion having mounting holes to affix the first side plate to a left side vehicle frame rail;
d) the second side plate including a mounting portion having mounting holes to affix the second side plate to a right side vehicle frame rail;
e) a pair of mounting feet extending from the center support toward a rear of the vehicle, the pair of mounting feet supporting the steering system such that the steering system is offset rearwardly of the center support; and
f) wherein the mounting holes of the first side plate are aligned with preexisting mounting holes in the left side vehicle frame rail and the mounting holes of the second side plate are aligned with preexisting mounting holes in the right side vehicle frame rail and further wherein the cradle center support is offset vertically below the mounting portions of the side plates to provide for clearance of the replacement steering system with respect to an undercarriage of the vehicle and the cradle center support being offset vertically below all of the mounting holes of the mounting portions of the side plates.

8. The cradle of claim 7 wherein each of the cradle side plates further include a downwardly extending wing affixed to respective ends of the center support.

9. The cradle of claim 8 wherein the cradle additionally includes a pair of gussets extending between respective mounting portions of the side plates and the center support.

10. The cradle of claim 9 wherein the downwardly extend wings and the pair of gussets form a right-angle bracket extending between the mounting portions of the side plates and the center support.

11. The cradle of claim 7 wherein the center support is channel-shaped when viewed in cross section.

12. The cradle of claim 7 wherein each of the pair of mounting feet includes a generally planar portion affixed to a lower surface of the center support and an upwardly curved fluted portion affixed to a rearward facing surface of the center support.

13. A replacement steering assembly for a rear steer vehicle wherein the rear steer vehicle includes frame rails and preexisting mounting holes in the frame rails for supporting an original steering system of the vehicle, the replacement steering assembly comprising:
a) a replacement steering system; and
b) a cradle for supporting the replacement steering system, the cradle including:
1) spaced apart first and second side plates and a center support extending between the first and second side plates;
2) the first side plate including a mounting portion having mounting holes to affix the first side plate to a left side vehicle frame rail;
3) the second side plate including a mounting portion having mounting holes to affix the second side plate to a right side vehicle frame rail;
4) the mounting holes of the first side plate being aligned with preexisting mounting holes in the left side vehicle frame rail and the mounting holes of the second side plate being aligned with preexisting mounting holes in the right side vehicle frame rail and the cradle center support being offset vertically below all of the mounting holes of the mounting portions of the side plates;
5) a pair of mounting feet extending from the center support toward a front of the vehicle, the pair of mounting feet supporting the steering system such that the steering system is offset forwardly of the center support; and
6) the cradle center support being offset vertically below the mounting portions of the side plates to provide for clearance of the replacement steering system with respect to an undercarriage of the vehicle.

14. A cradle for supporting a replacement steering system in a rear steer vehicle wherein the rear steer vehicle includes frame rails and preexisting mounting holes in the frame rails to support an original steering system of the vehicle, the cradle comprising:
a) spaced apart first and second side plates;
b) a center support extending between the first and second side plates to which the replacement steering assembly is coupled;
c) the first side plate including a mounting portion having mounting holes to affix the first side plate to a left side vehicle frame rail;
d) the second side plate including a mounting portion having mounting holes to affix the second side plate to a right side vehicle frame rail;
e) a pair of mounting feet extending from the center support toward a front of the vehicle, the pair of mounting feet supporting the steering system such that the steering system is offset forwardly of the center support; and
f) wherein the mounting holes of the first side place are aligned with preexisting mounting holes in the left side vehicle frame rail and the mounting holes of the second side plate are aligned with preexisting mounting holes in the right side vehicle frame rail and further wherein the cradle center support is offset vertically below the mounting portions of the side plates to provide for clearance of the replacement steering system with respect to an undercarriage of the vehicle and the cradle center support being offset vertically below all of the mounting holes of the mounting portions of the side plates.

15. The cradle of claim 14 wherein each of the pair of mounting feet includes a generally planar portion affixed to a lower surface of the center support and an upwardly curved fluted portion affixed to a forward facing surface of the center support.

* * * * *